May 12, 1936.  C. H. KAUFMAN  2,040,205
BROOM RAKE
Filed April 1, 1935  2 Sheets-Sheet 1
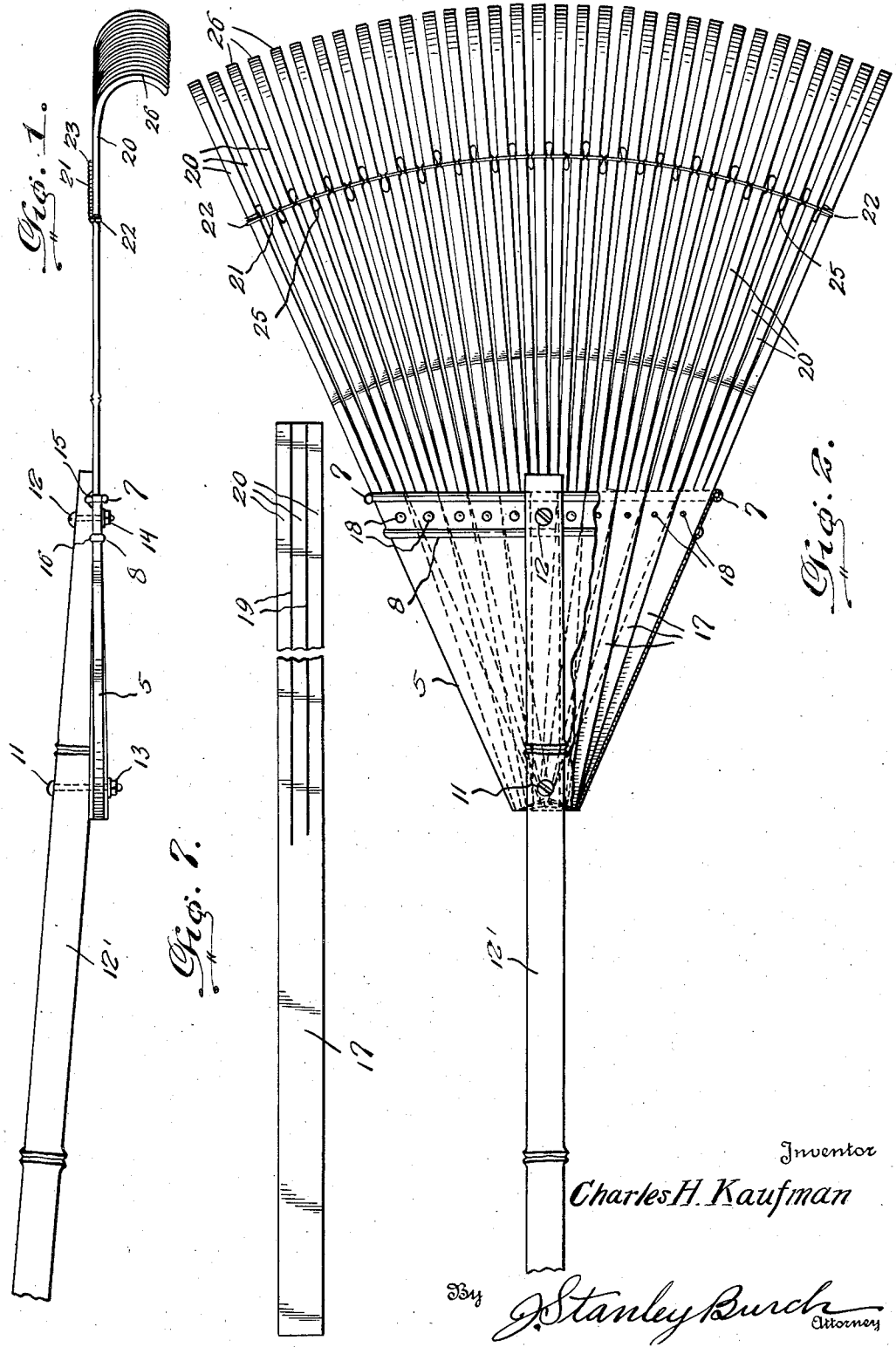

May 12, 1936.  C. H. KAUFMAN  2,040,205
BROOM RAKE
Filed April 1, 1935   2 Sheets-Sheet 2
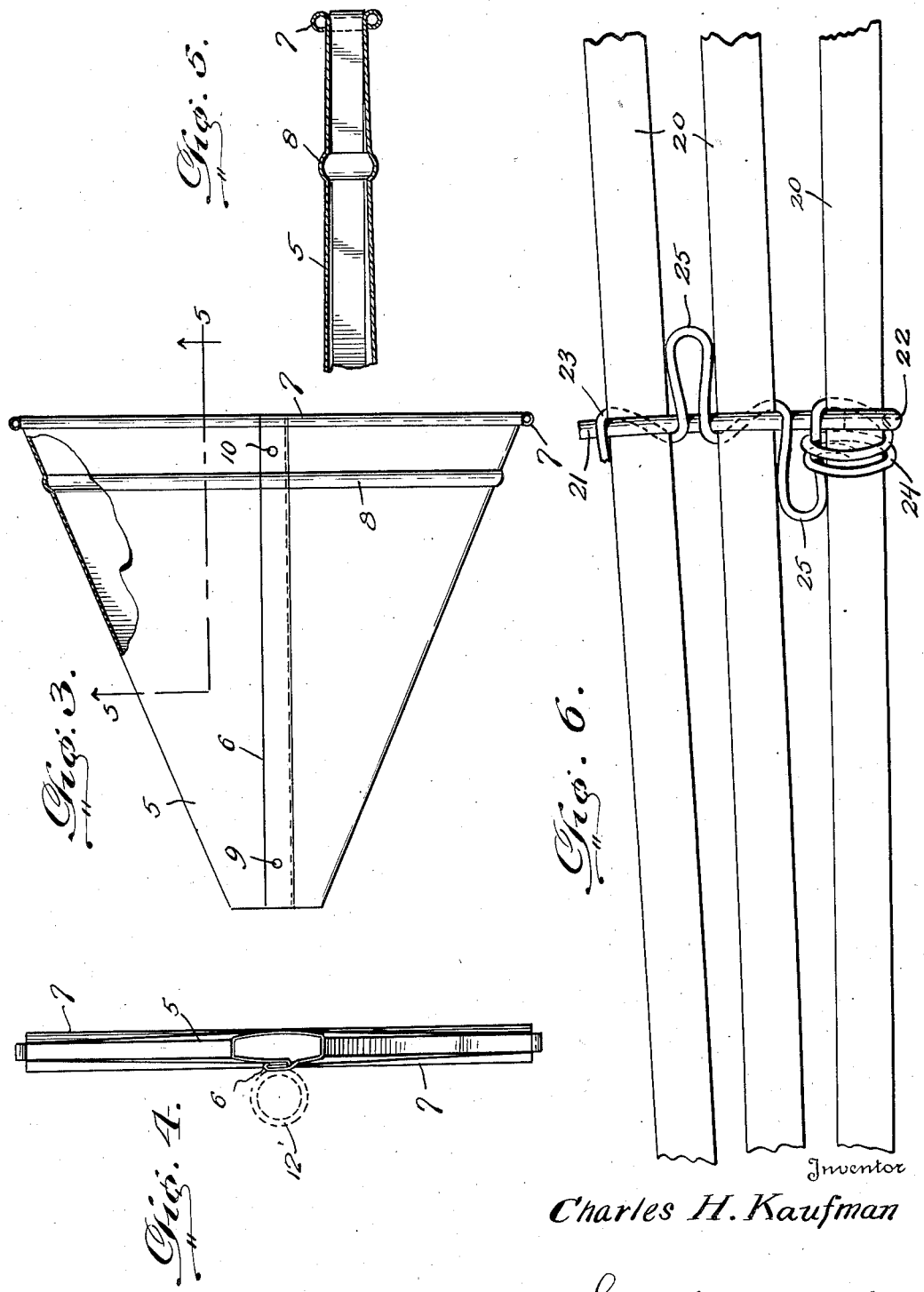
Inventor
Charles H. Kaufman
By J. Stanley Burch
Attorney Patented May 12, 1936

2,040,205

UNITED STATES PATENT OFFICE 2,040,205

BROOM RAKE

Charles H. Kaufman, San Antonio, Tex.

Application April 1, 1935, Serial No. 14,158

4 Claims. (Cl. 55—114)

This invention relates to broom rakes such as are commonly employed for removing leaves and litter from lawns, etc.

An object of my invention is to provide an improved construction of broom rake wherein a plurality of tine-forming strips are assembled and secured together so as to provide an extremely strong and durable structure.

Another object of my invention is to provide an improved form of broom rake wherein bamboo-tine forming strips are so employed and assembled as to provide for efficiency in use, as well as great durability, simple and efficient means being provided for reinforcing the tines and evenly distributing the flexing of the latter throughout all of the same.

Another object of my invention is to provide an improved broom rake of the above character wherein simple and efficient means is provided for supporting and maintaining the tine-forming strips in assembled relation.

Other objects and features of my invention will become apparent from the following description when considered in connection with the accompanying drawings, in which:

Figure 1 is a side elevational view of a broom rake constructed in accordance with the present invention.

Figure 2 is a top plan view thereof, partly broken away and in section.

Figure 3 is a plan view of the tine supporting socket forming part of the rake shown in Figures 1 and 2, partly broken away and in section.

Figure 4 is an elevational view of the device shown in Figure 3 looking toward the inner or smaller end thereof.

Figure 5 is a fragmentary section on line 5—5 of Figure 3.

Figure 6 is an enlarged fragmentary plan illustrating details of the means for spacing and reinforcing the tines, and for evenly distributing the flexing of said tines throughout all of the same; and Figure 7 is a plan view of one of the tine-forming strips.

Referring more in detail to the drawings, the illustrated embodiment of the invention includes a tapered flat-like tine-supporting socket 5, preferably formed from a single piece of sheet metal with the longitudinal edges thereof interlocked in a seam 6 extending centrally between the sides of the socket. As shown, the outer wider end of the socket 5 is reinforced by outwardly rolling the edge thereof as at 7, and additional reinforcement is provided by transversely corrugating the socket 5 as at 8 near its outer wider end, the corrugation 8 being pressed outwardly as shown. Apertures 9 and 10 are provided through the opposite flat walls of the socket 5 respectively adjacent the inner and outer ends of the latter, and these apertures receive bolts 11 and 12 that also pass through the outer end of a handle 12' for rigidly securing the latter to the socket 5, suitable nuts 13 and 14 being applied to the threaded ends of the bolts 11 and 12. The handle 12' preferably consists of a bamboo pole so as to provide for strength and lightness of weight the outer end portion of said handle being flattened on one side to flatly contact one side of the socket 5 against which it is secured, and said flattened side of the handle 12' being recessed to accommodate the rolled edge 7 and reinforcing corrugation 8 of the socket 5 as indicated at 15 and 16 in Figure 1.

The present rake further includes a plurality of flexible resilient tine-forming strips 17, which are preferably strips of bamboo, and which are assembled in fan-like relation with their inner end portions overlapped and fitted within the socket 5 as shown clearly in Figure 2. These tine-forming strips are secured with their inner end portions within the socket 5 by means of rivets 18 which pass through the opposite flat walls of socket 5 and firmly clamp the latter in the socket 5 at the outer wider end of the latter, the opposite flat walls of the socket 5 being drawn together tightly against the opposite faces of the tine-forming strips when the rivets 18 are applied. These rivets 18 pass through the socket 5 between the rolled edge 7 and corrugation 8, one rivet passing through each tine-forming strip. In this way, a light construction is had which is very durable, and there is little likelihood of any of the tine-forming strips being pulled loose from the socket. Naturally, the rolled edge 7 and corrugation 8 reinforce the socket 5 against bending along longitudinal lines and a consequent undesirable relative derangement of the tine-forming strips.

As before stated, the tine-forming strips 17 are preferably in the nature of bamboo strips which are highly resilient and flexible and therefore not readily susceptible to breakage by flexure. These strips are relatively thick, and each of them has its outer end portion slitted longitudinally as at 19 to provide a plurality of tines 20. Extending across the upper surfaces of all of the tines 20 intermediate the inner and the outer free ends thereof is a metallic reinforcing rod preferably consisting of a piece of stiff spring wire, and having its ends return-bent to provide hooks at 22 engaging around the outer edges of the outermost tines so as to assist in maintaining the rod 21 in its operative position and at the same time prevent undue spreading of the tines. The operative position of the reinforcing rod 21 is further maintained by a piece of soft wire 23 which passes across the under side of each tine and then upwardly over the rod 22 between adjacent tines, the ends of the wire 23 being wrapped around the outermost tine as at 24. In this way the rod 21 is securely fastened in place, and the portions of the wire 23 between adjacent tines is preferably extended, alternately in opposite directions, to form elongated open loops 25 contacting the adjacent edges of adjacent tines and maintaining them in uniformly spread spaced relation. By means of this construction, flexing of any of the tines is evenly distributed to the rest of the tines, and said tines are effectively reinforced against undue flexure and breakage. For the usual purpose, the tines 20 are suitably formed with downwardly bent outer end portions to provide raking fingers 26.

From the above description, it will be apparent that I have provided a broom rake construction possessing the stated and other advantageous features. It will also be apparent that the specific conscription illustrated and described is susceptible of modifications without departing from the spirit and scope of the invention as claimed.

What I claim as new is:

1. In a broom rake, a tapered flat-like supporting socket, a plurality of flat flexible tine-forming strips having overlapped inner end portions fitted within said socket, said tine-forming strips projecting outwardly of said socket in diverging relation, and means causing the tine-forming strips to be securely clamped between the opposing flat walls of the socket at the outer wider end of the latter, said last-named means comprising rivets passing through the opposing walls of the socket, and one of said rivets passing through each of said tine-forming strips.

2. In a broom rake, a tapered flat-like supporting socket, a plurality of flat flexible tine-forming strips having overlapped inner end portions fitted within said socket, said tine-forming strips projecting outwardly of said socket in diverging relation, and means causing the tine-forming strips to be securely clamped between the opposing flat walls of the socket at the outer wider end of the latter, said last-named means comprising rivets passing through the opposing walls of the socket, and one of said rivets passing through each of said tine-forming strips, said socket being formed of sheet metal and having an outwardly rolled outer edge and a transversely extending reinforcing corrugation adjacent its outer edge, said rivets extending in a transverse line between said rolled edge and said corrugation.

3. In a broom rake, a supporting socket, a plurality of flat flexible tine-forming strips carried by said socket, said tine-forming strips projecting outwardly of said socket in diverging relation, said tine-forming strips comprising relatively wide and thick strips of bamboo, each of said bamboo strips having the outer end portions thereof slitted longitudinally to provide a plurality of tines, means intermediate the ends of said tines for spreading and maintaining them in uniformly spread relation, said last-named means including a stiff rod extending across all of the tines and having hooked ends engaged around the outermost tines, and a wire element extending across the tines and around said rod intermediate the tines for tightly securing the latter to the rod.

4. In a broom rake, a supporting socket, a plurality of flat flexible tine-forming strips carried by said socket, said tine-forming strips projecting outwardly of said socket in diverging relation, said tine-forming strips comprising relatively wide and thick strips of bamboo, each of said bamboo strips having the outer end portions thereof slitted longitudinally to provide a plurality of tines, means intermediate the ends of said tines for spreading and maintaining them in uniformly spread relation, said last-named means including a stiff rod extending across all of the tines and having hooked ends engaged around the outermost tines, and a wire element extending across the tines and around said rod intermediate the tines for tightly securing the latter to the rod, the portions of the wire intermediate the tines being extended in the form of open loops engaged between opposing edges of adjacent tines.

CHARLES H. KAUFMAN.